US012569785B2

(12) United States Patent
Reeves

(10) Patent No.: US 12,569,785 B2
(45) Date of Patent: Mar. 10, 2026

(54) AUTOMATIC FLUSHING SYSTEM FOR FILTERS ASSOCIATED WITH AN IRRIGATION SYSTEM

(71) Applicant: Barry H. Reeves, Union City, TN (US)

(72) Inventor: Barry H. Reeves, Union City, TN (US)

( * ) Notice: Subject to any disclaimer, the term of this patent is extended or adjusted under 35 U.S.C. 154(b) by 0 days.

(21) Appl. No.: 17/750,445

(22) Filed: May 23, 2022

(65) Prior Publication Data

US 2022/0370933 A1 Nov. 24, 2022

Related U.S. Application Data

(60) Provisional application No. 63/191,971, filed on May 22, 2021.

(51) Int. Cl.
| | |
|---|---|
| *B01D 29/66* | (2006.01) |
| *B01D 29/60* | (2006.01) |
| *B01D 35/143* | (2006.01) |
| *B05B 15/40* | (2018.01) |
| *B05B 15/55* | (2018.01) |

(52) U.S. Cl.
CPC ......... *B01D 29/668* (2013.01); *B01D 29/603* (2013.01); *B01D 29/606* (2013.01); *B01D 35/143* (2013.01); *B05B 15/40* (2018.02); *B05B 15/55* (2018.02)

(58) Field of Classification Search
CPC .. B01D 29/668; B01D 29/603; B01D 29/606; B01D 29/66; B01D 29/60; B01D 35/143; B01D 35/153; B01D 2311/22; B05B 15/40; B05B 15/55; A01G 25/09
USPC ....................................................... 210/103
See application file for complete search history.

(56) References Cited

U.S. PATENT DOCUMENTS

| | | | |
|---|---|---|---|
| 4,031,915 | A | 6/1977 | Mcelhoe et al. |
| 4,919,163 | A | 4/1990 | Rosenberg |
| 5,535,778 | A | 7/1996 | Zakai |
| 7,097,113 | B2 | 8/2006 | Ivans |
| 7,191,955 | B2 | 3/2007 | Ivans |
| 7,766,262 | B2 | 8/2010 | Gillespie et al. |
| 8,919,678 | B2 | 12/2014 | Beer et al. |
| 9,066,476 | B2 | 6/2015 | Christiansen |

(Continued)

FOREIGN PATENT DOCUMENTS

| | | |
|---|---|---|
| WO | 02088472 A1 | 11/2002 |
| WO | 2012070945 A1 | 5/2012 |
| WO | 2018055505 A1 | 3/2018 |

*Primary Examiner* — Akash K Varma
(74) *Attorney, Agent, or Firm* — Moore & Van Allen PLLC; W. Kevin Ransom

(57) ABSTRACT

Disclosed is a flushing system for flushing debris from a sand trap of an irrigation system. The system includes a controlled valve fluidly coupled to a flush outlet of the sand trap. The valve is electronically controlled, such that when open and with the irrigation system running, water from the irrigation system entering the sand trap, flushes the sand trap via the valve. In one embodiment, the flush system comprises a valve connected to a flush outlet of the sand trap. A control unit in electrical communication with the valve and a sensor is associated with the control unit for sensing an operation of the irrigation system. The control unit is configured to control the valve to open or close based on input from the sensor relating to operation of the irrigation system, wherein when the valve is open fluid and/or debris can be purged from the sand trap.

17 Claims, 7 Drawing Sheets

(56) References Cited

U.S. PATENT DOCUMENTS

| | | | |
|---|---|---|---|
| 9,668,430 | B2 | 6/2017 | Cohen |
| 2006/0131441 | A1* | 6/2006 | Ivans .................... A01G 25/16 |
| | | | 239/104 |
| 2008/0087749 | A1* | 4/2008 | Ruskin ................ A01G 25/165 |
| | | | 239/565 |
| 2008/0283637 | A1 | 11/2008 | Gillespie et al. |
| 2014/0008451 | A1* | 1/2014 | Christiansen .......... B05B 15/40 |
| | | | 239/735 |

* cited by examiner

S100

AUTOMATIC FLUSHING SYSTEM FOR FILTERS ASSOCIATED WITH AN IRRIGATION SYSTEM

CROSS-REFERENCE TO RELATED APPLICATION

This application is a non-provisional application of and claims priority to U.S. Provisional Application No. 63/191, 971 filed May 22, 2021, of the same title; the contents of which are also hereby incorporated herein by reference.

FIELD OF THE INVENTION

The present invention relates to a system for flushing sand and other debris from filters associated with irrigation systems.

BACKGROUND

Many irrigation systems, including those used in crop production, include filter traps, typically referred to as sand traps, to collect sand, dirt, and other debris that may be in the water supply prior to the water being provided to the spray nozzles, so as to prevent clogging or damage to the nozzles. Crop production irrigation systems are rather large pieces of equipment that stand above the maximum growth of the crop. In many instances, as shown in FIG. 1A (this figure is not prior art), the sand trap is located approximately 15 feet high on the end of a tower. After several hours of crop irrigation, the trap may collect a significant amount of sand and/or debris that warrants the trap to be emptied/flushed. If the trap is not emptied/flushed in a timely manner, sand and/or debris can accumulate causing the tips and end guns of the irrigation system to work improperly, disrupting irrigation output, or possibly even shutting down irrigation process entirely.

At this point the operator needs to locate the end tower (which could be anywhere in the field at time of shut down), climb the tower, and manually empty the sand trap. If the irrigation system is running at night and the sand trap fills with sand; the entire system may shut down resulting in a loss of valuable irrigation time during the hot, dry summer.

SUMMARY OF THE INVENTION

The present invention relates to a system for flushing the sand and debris from sand traps (referred to herein also as a "filter"). The flushing system is associated with the sand trap and includes a controlled valve fluidly coupled to a flush outlet of the sand trap (filter). The valve can be either manually or electronically controlled, such that when open and with the irrigation system running, water from the irrigation system entering the sand trap, flushes the sand and debris from the sand trap via the valve.

As will be understood, the invention may be implemented in various ways. For example, the valve could be a manually operated valve that a user/operator can access to clean/purge the sand trap. In other embodiments, the valve may be an electro-mechanical valve that the user/operator could operate electronically, either by a switch or a control unit. In further embodiments, the valve could be controlled automatically by a control unit, using either a specialized control chip such as and ASIC or software or firmware to provide a timed cycle for opening and closing the valve.

As an example of another embodiment, the system could further include a sensor, such as a pressure or a flow sensor or receive an electrical signal from the controller of the irrigation system indicating that the irrigation system is in use. In this embodiment, the controller for the flush system will actuate the valve opening only in times when the irrigation system is in use via the signal received either from a sensor or a signal from the electronic controller for the irrigation system. Further, the signal could be used to toll a counter that counts the amount of time the irrigation system is in use so as to control the opening and closing interval for the valve. For example, during operation, the sensor can provide a signal to the control unit for the flush system when the irrigation system is operating. The control unit for the flush system can use a counter to toll the time that the irrigation system is in use. After a period of irrigation system operation, say five (5) hours, the control unit could actuate the valve to open and clean the sand trap, say keeping the valve open for say one (1) minute.

As one example, the control unit could be programmed so that the valve can be set to open and stay open for a period of 0.1 (one-tenth)-10 (ten) minutes when opened and be opened in intervals set from every 0.1 (one-tenth)-10 (ten) hours. Further, generally, the valve would be opened at a time when the irrigation system is operating or otherwise has water or air pressure necessary for the sand trap to be flushed.

In furtherance of the above, in one embodiment, the present invention provides a flush system for flushing a filter of an irrigation system, the flush system comprising a valve in fluid communication with a flush outlet of the filter of the irrigation system. A control unit is in electrical communication with the valve, and a sensor is associated with the control unit for sensing an operation of the irrigation system. During operation, the control unit is configured to control the valve to open or close based on input from the sensor relating to operation of the irrigation system, such that when the valve is open, fluid and/or debris can be purged from the filter.

In one embodiment, the sensor is configured to sense whether or not the irrigation system is operating, and wherein the control unit controls the valve to open during a time when the sensor indicates that the irrigation system is in operation. In one embodiment, the sensor is at least one of a flow sensor or a pressure sensor. In one embodiment, the sensor is located in a flow path of the irrigation system, where the flow path is in fluid communication with the filter. In this embodiment, the sensor is either a flow sensor for sensing and/or measuring a flow of fluid in the flow path or is a pressure sensor for sensing and/or measuring a pressure in the flow path to thereby indicate when the irrigation system is in operation.

In one embodiment, the sensor is associated with the filter is at least one of a flow sensor or a pressure sensor to respectively sense and/or measure a flow of fluid in the filter and/or a pressure in the filter.

In one embodiment, the sensor is a flow sensor and is configured to sense and/or measure a flow of fluid in the filter. The control unit is configured to control the valve to open when a flow of fluid in the filter is below a flow threshold value.

In one embodiment, the sensor is a pressure sensor and is configured to sense and/or measure a pressure in the filter. In this embodiment, the control unit is configured to control the valve to open when a pressure in the filter exceeds a first threshold pressure value. In a further embodiment, the control unit is configured to control the valve to close when a pressure in the filter is less than second threshold pressure value.

In one embodiment, the flush system further comprises a timer associated with the control unit, wherein the control unit is configured to control the valve based on output from the timer. In one embodiment, the timer counts to a preselected time, at which point the control unit opens the valve, if the sensor indicates that the irrigation system is in operation. In one embodiment, the control unit opens the valve for a selected time interval as determined by the timer, such as for 1 to 60 seconds or 1 to 20 seconds, as examples. In some embodiments, the valve can be set to open and stay open for a period of 0.1 (one-tenth)-10 (ten) minutes with intervals set from 0.1 (one-tenth)-10 (ten) hours providing the system has water pressure necessary for the sand trap system to be flushed.

In some embodiments, the timer and control unit are combined as a timer switch, whereby the switch is operated by a selected timer count of the timer to either open or close to thereby selectively supply power from a power source to the valve.

In some embodiments, the flush system comprises a clock associated with the control unit, wherein the control unit is configured to control the valve based on output from the clock. For example, the control unit may be configured to open the valve at one or more certain times of day based on input from the clock.

In some embodiments, the valve comprises an inlet configured for communication with the flush outlet of the filter and an outlet, wherein the flush system further comprises a deflector associated with the outlet of the valve to deflect fluid and/or debris exiting the outlet of the valve.

In some embodiments, the flush system comprises a coupler positioned between the flush outlet of the filter and the valve.

In one embodiment, a flush system is provided for flushing a filter of an irrigation system, where the flush system comprises a valve in fluid communication with a flush outlet of the filter of the irrigation system. A control unit is in electrical communication with the valve and a sensor associated with the control unit for sensing at least one of a flow or a pressure in the irrigation system. One of a timer or a clock are connected or part of the control unit. The control unit is configured to control the valve to open or close based on input from the sensor indicating that the irrigation system is in operation and based on input from the timer or clock, wherein when the valve is open fluid and/or debris can be purged from the filter.

In one embodiment, a flush system is provided for flushing a filter of an irrigation system, where the flush system comprises a valve in fluid communication with a flush outlet of the filter of the irrigation system. A control unit is in electrical communication with the valve and a first sensor located in a flow path of the irrigation system, where the flow path is in fluid communication with the filter and the first sensor is configured to sense whether or not the irrigation system is operating. A second sensor associated with the filter so as to sense a pressure in the filter. In this embodiment, the control unit controls the valve to open during a time when the first sensor indicates that the irrigation system is in operation and when the second sensor senses a pressure in the filter that exceeds a first threshold to thereby purge fluid and/or debris from the filter.

DETAILED DESCRIPTION OF THE INVENTION

Figures 1A, 1B:
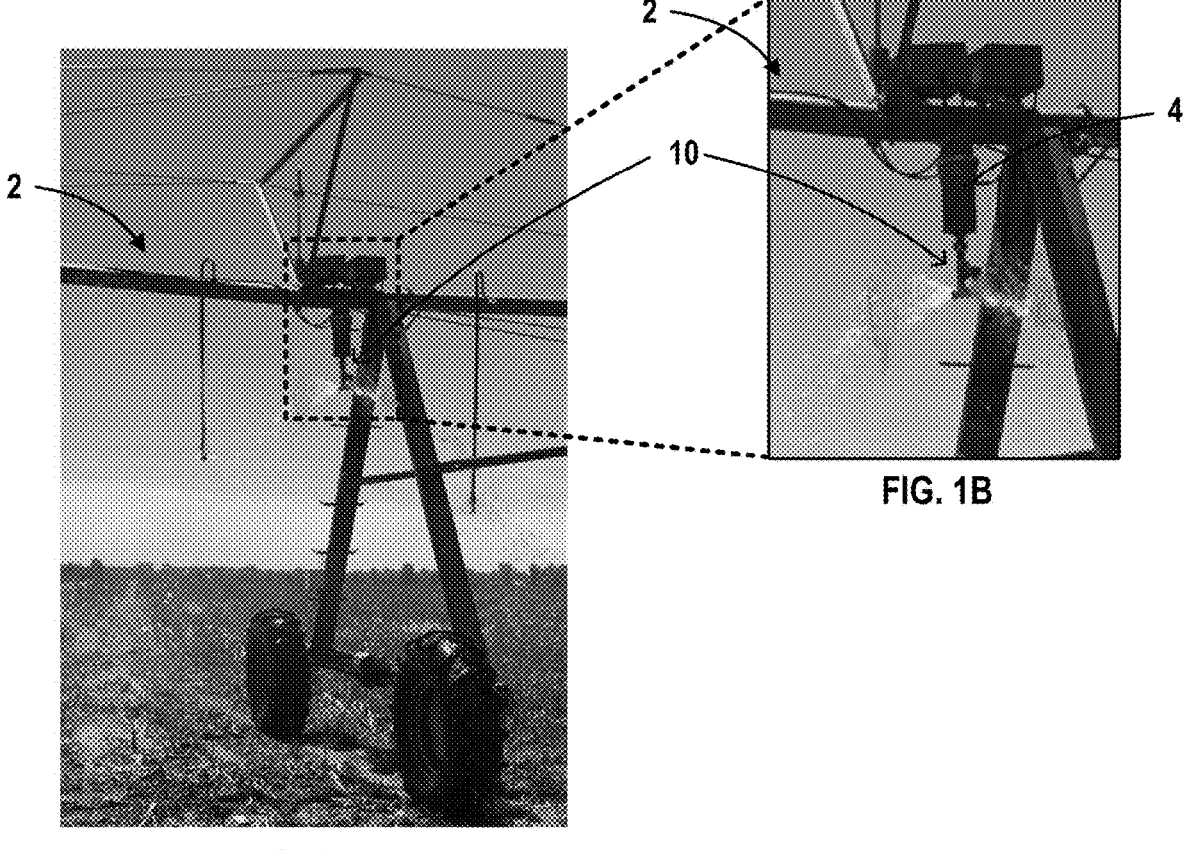
FIGS. 1A and 1B are perspective views of the flush system according to one embodiment of the present invention connected to an exemplary irrigation system.

FIGS. 1A and 1B depict an exemplary irrigation system 2 for which one or more embodiments of the flush system of the present invention may be implemented. As shown, an embodiment of the flush system 10 is connected to a flush outlet (not labelled) of a filter/sand trap 4 of the irrigation system 2. FIGS. 1A and 1B illustrate the flushing system in operation as it purges fluid and/or debris from the filter 4.

Figure 2:
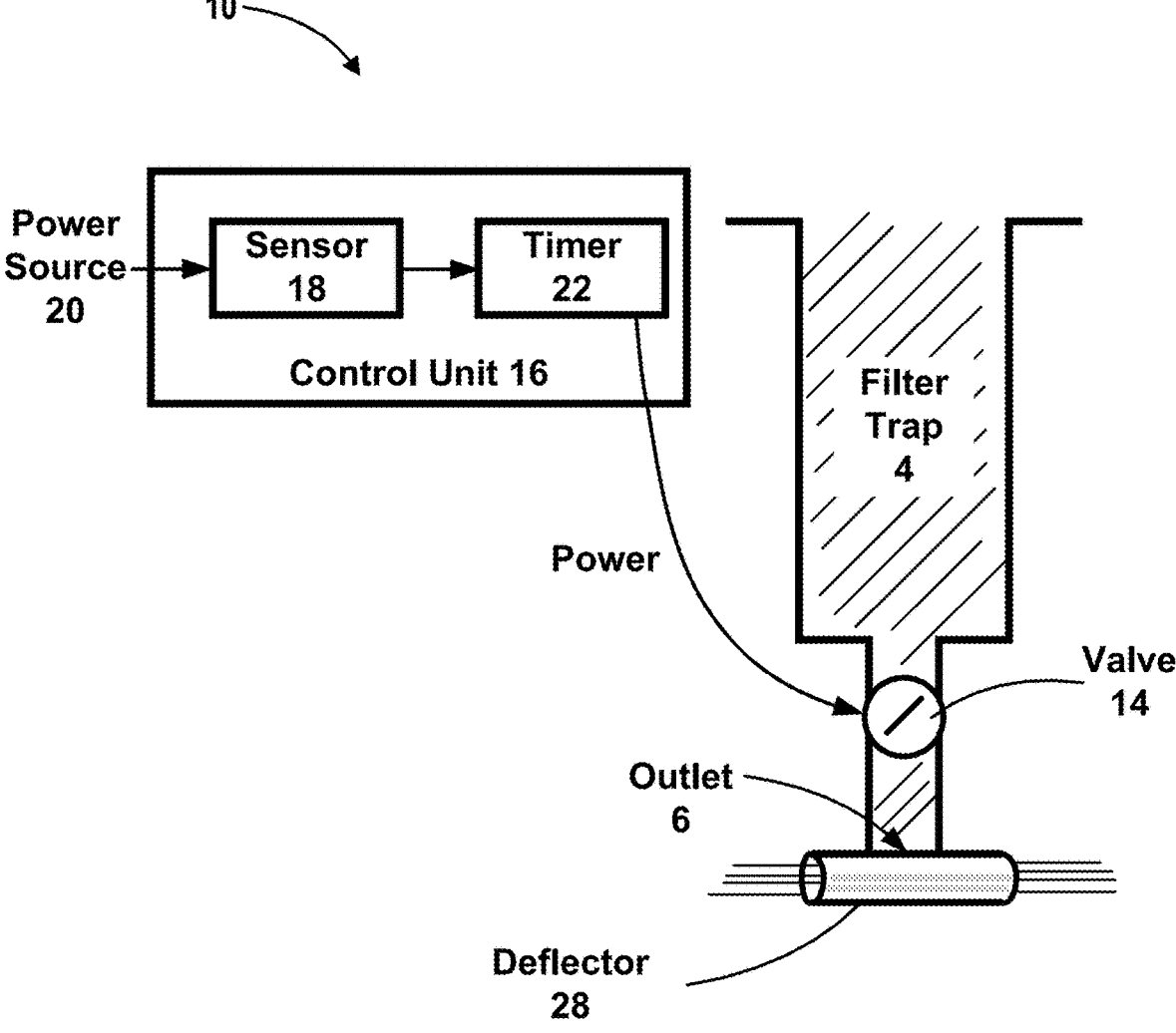
FIG. 2 is a perspective view of the flush system according to one embodiment of the present invention.

FIG. 2 is schematic depiction of one embodiment of the present invention depicting the flush system 10 connected to a flush outlet 6 of the filter 4. The flush outlet 6 will typically be on the bottom or at the bottom of a side of the filter 4. The flush system 10 includes a coupling device 12 connecting the flush system 10 to the flush outlet 6 of the filter 4. The coupling device 12 can be any known clamp or other pipe coupling device for coupling the flush system to the flush outlet 6 and, in some instances, may be a quick disconnect type, such as offered by Banjo (e.g., Female Coupler x MNPT Cam Lever Coupling Mfr #: 150B).

The flush system 10 comprises an electro-mechanically controllable valve 14 that can be selectively opened by a controller to open and close the valve for cleanout of the sand trap filter 4. It is understood that any controllable valve can be used that is capable of allowing for flow of fluid and/or debris from the filter. In this embodiment, the valve is a ball valve.

Connected to the valve 14 is a control unit 16. The control unit can be a programmable controller capable of operation via firmware or software. In some embodiments, the control unit can be an analog type controller operating based on logical signals and switches. As depicted, the controller unit 16 of one embodiment comprises a sensor 18 in the form of a pressure switch or flow switch connected to a power source 20. The sensor 18 is connected to a flow path of the irrigation system that is in fluid communication with the filter, such as a water conduit leading from the filter downstream to the nozzles of the irrigation system. While the sensor may be located in any part of the irrigation system in fluid communication with the filter, locating the sensor downstream of the filter will indicate that if water is flowing at this location, then water is flowing through the filter 4.

The sensor 18 may be configured to sense either a flow or a pressure in the irrigation system, where presence of a flow or a pressure indicates that the irrigation system is in operation. For example, in one embodiment, the sensor could be located in the filter itself to thereby indicate when the filter is receiving adequate fluid flow or pressure to perform a purge operation. The purpose of determining whether the irrigation system is operating is to use pressure from the irrigation system 2 to flush the filter 4. Specifically, during operation of the irrigation system 2, water at sufficient pressure is provided to the sand trap 4. While the valve 14 could be opened at any time to release some of the sand and debris in the sand trap, if the valve is opened while the irrigation system is operating, water from the irrigation system will flush sand and debris from the sand trap through the valve more readily. In other words, while the valve could be opened while the irrigation system is off and provide some level of emptying, the valve is usually controlled to open when the irrigation system is operating to ensure proper flushing.

In one embodiment, the sensor 18 is a pressure switch, where the switch is actuated when the pressure switch is exposed to a selected pressure threshold. As shown in FIG. 2, when the sensor 18, as a pressure switch, is exposed to a threshold pressure set as a minimum pressure for defining that the irrigation system is in operation, the switch is closed thereby providing power from a power source 20 to the valve for opening the valve.

As further shown in FIG. 2, the control unit 16 may comprise a timer 22 connected between the sensor 18 and the valve 14. In this embodiment, once the sensor 18, as a pressure switch, is activated indicating that the irrigation system is operating, the sensor 18 supplies power from the power source 20 to the timer 22. Once activated, the timer 22 begins a count and once the timer reaches a certain count, it provides power to the valve 14 to open the valve and thereby purge the filter. After a certain further count on the timer 22, the timer disconnects the power to the valve and the valve closes to discontinue purge of the filter. In some embodiments, the timer 22 may be configured to open and close the valve over various cycles via operation of the timer. In some embodiments, the valve can be set to open and stay open for a period of 0.1 (one-tenth)-10 (ten) minutes with intervals set from 0.1 (one-tenth)-10 (ten) hours providing the system has water pressure necessary for the sand trap/filter to be flushed.

For example, when the sensor 18 senses that the irrigation system 2 is in operation, it will supply power to the timer 22. The timer 22 will then begin a count. When the timer 22 reaches a determined count 22, it will close a switch associated with the timer to supply power to the valve 14. The valve 14 will open and remain open until the timer reaches a second predetermined count, at which time the timer will open its associated switch shutting off power to and thereby closing the valve. Based on how the timer 22 is programmed, this could be repeated several times during operation of the flush system. As understood, at any time the sensor 18 senses that the irrigation system has ceased operation, the sensor 18 will cut off power to the timer, thereby interrupting the flush cycle.

In some embodiments, the sensor 18 is a flow sensor. In this embodiment, instead of providing a pressure reading or triggering based on pressure, the sensor is triggered based on a detected flow. For example, the sensor 18 may be a flow switch whereby when a certain threshold value of flow is sensed by the sensor 18, the flow switch is closed providing power to the timer 22.

As shown in FIG. 2, a deflector 28 may be employed at an exit of the valve 14 so as to disperse the sand and debris as it leaves the filter 4. In some embodiments, the deflector is a pipe connected perpendicular to the outlet of the filter 4 or a plate that is oriented perpendicular or at some angle relative to the outlet of the filter 4 to thereby deflect the fluid and debris exiting the filter.

Figure 3:
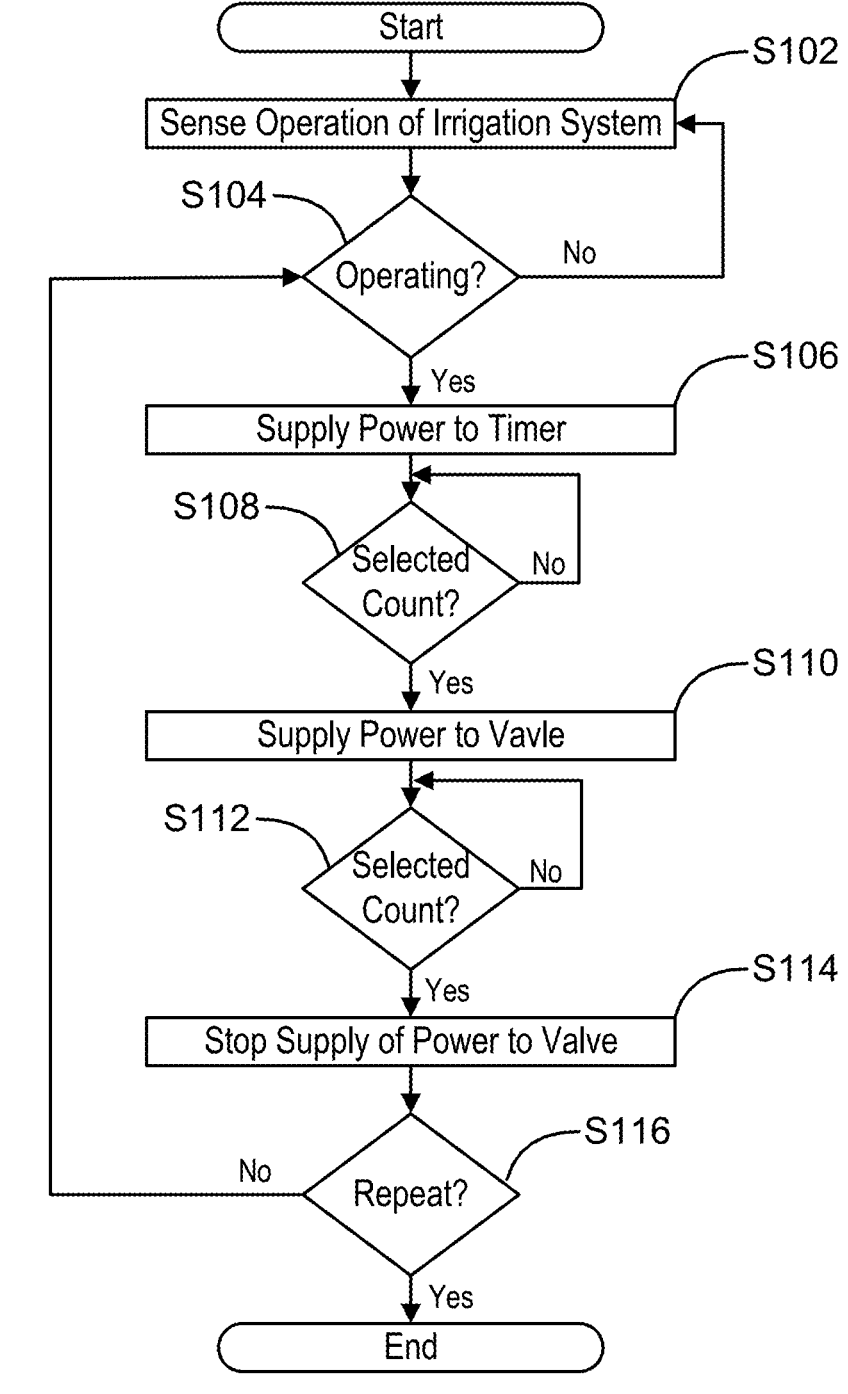
FIG. 3 is a flow diagram illustrating at least one operation of the flush system depicted in FIG. 2.

FIG. 3 provides a flowchart of an exemplary operation (S100) of the embodiment of FIG. 2. In this embodiment, the sensor 18 initially senses a pressure or flow or both (S102) that is above a set threshold (S104). The sensor 18 provides power from the power source 20 to the timer 22 (S106). The timer begins a count. Once the timer 22 reaches a selected count value (S108), the timer supplies power to the valve, thereby opening the valve (S110). The timer continues to count, and once the timer reaches a next selected count value (S112), the timer controls the valve to close thereby discontinuing purge of the filter (S114).

In some embodiments, steps S110 thru S114 may be repeated multiple times (S116), depending on the need to flush the filter. While not shown, the method further involves continuously or periodically checking to ensure that the irrigation system is operating via sensor 18. At any time the irrigation system ceases operation, the valve is returned to closed, if open, and the flush system 10 does not attempt the flush operation. For example, as shown in FIG. 2, when the sensor 18 ceases to sense a flow or pressure above a threshold, the switch associated with the sensor 18 opens, thereby no longer supplying power to the timer 22, which, in turn, no longer supplies power to the valve 14, and the valve closes. Once the sensor 18 again senses that flow and/or pressure in the irrigation system reaches the selected threshold indicating that the irrigation system is operating, power will be supplied to the timer 22 and the timer may either start anew as reset or it may pick up its current count in performing the operations.

Figure 4:
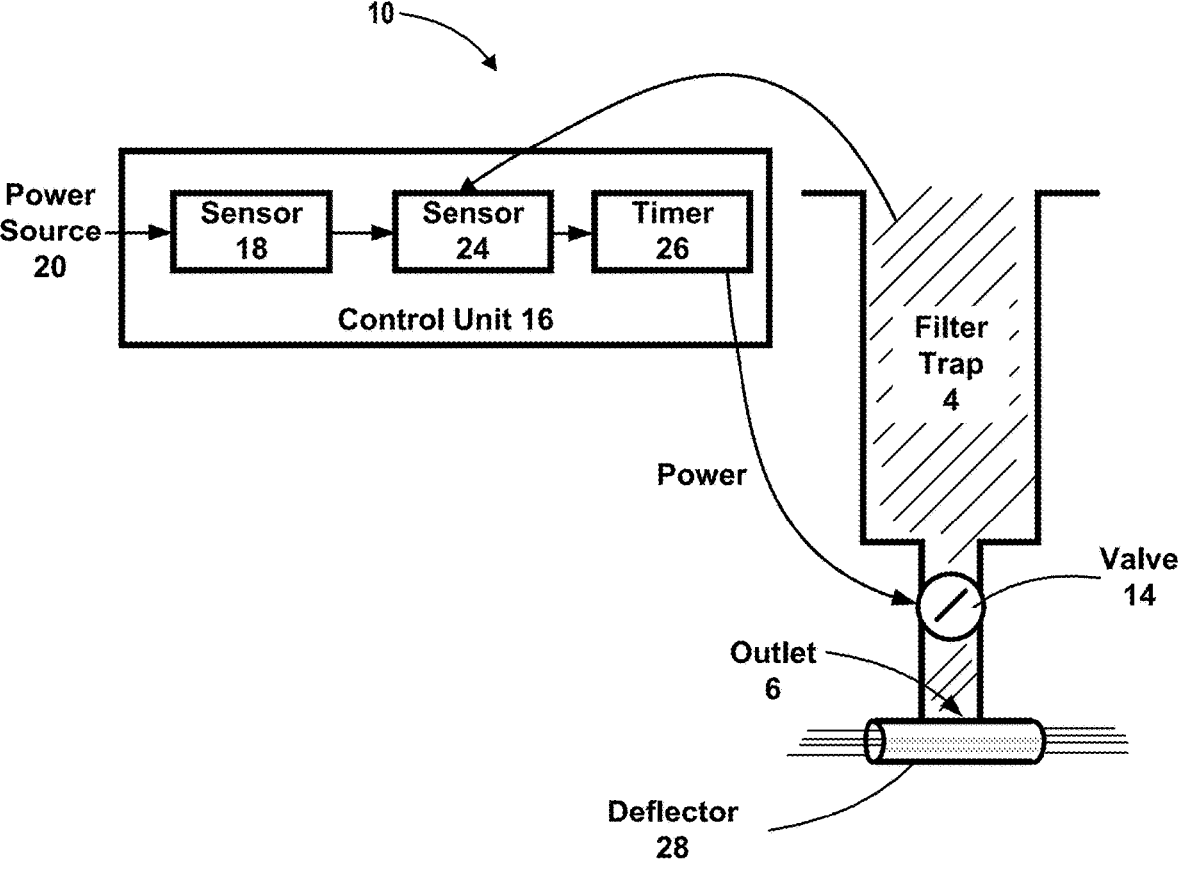
FIG. 4 is a schematic view of a flush system according to another embodiment of the invention.

FIG. 4 discloses an alternative arrangement of the flush system of the present invention. In this embodiment, a second sensor 24 is connected between the first sensor 18 and a count-down timer 26. The second sensor 24 is associated with the filter 14 to sense at least one of a flow in the filter, or a pressure in the filter, or a level of debris build up in the filter. In this embodiment, second sensor 24 provides an indication of when the filter should be purged based on either pressure build up in the filter or a lack of flow in the filter due to debris or a level of debris in the filter.

Figure 5:
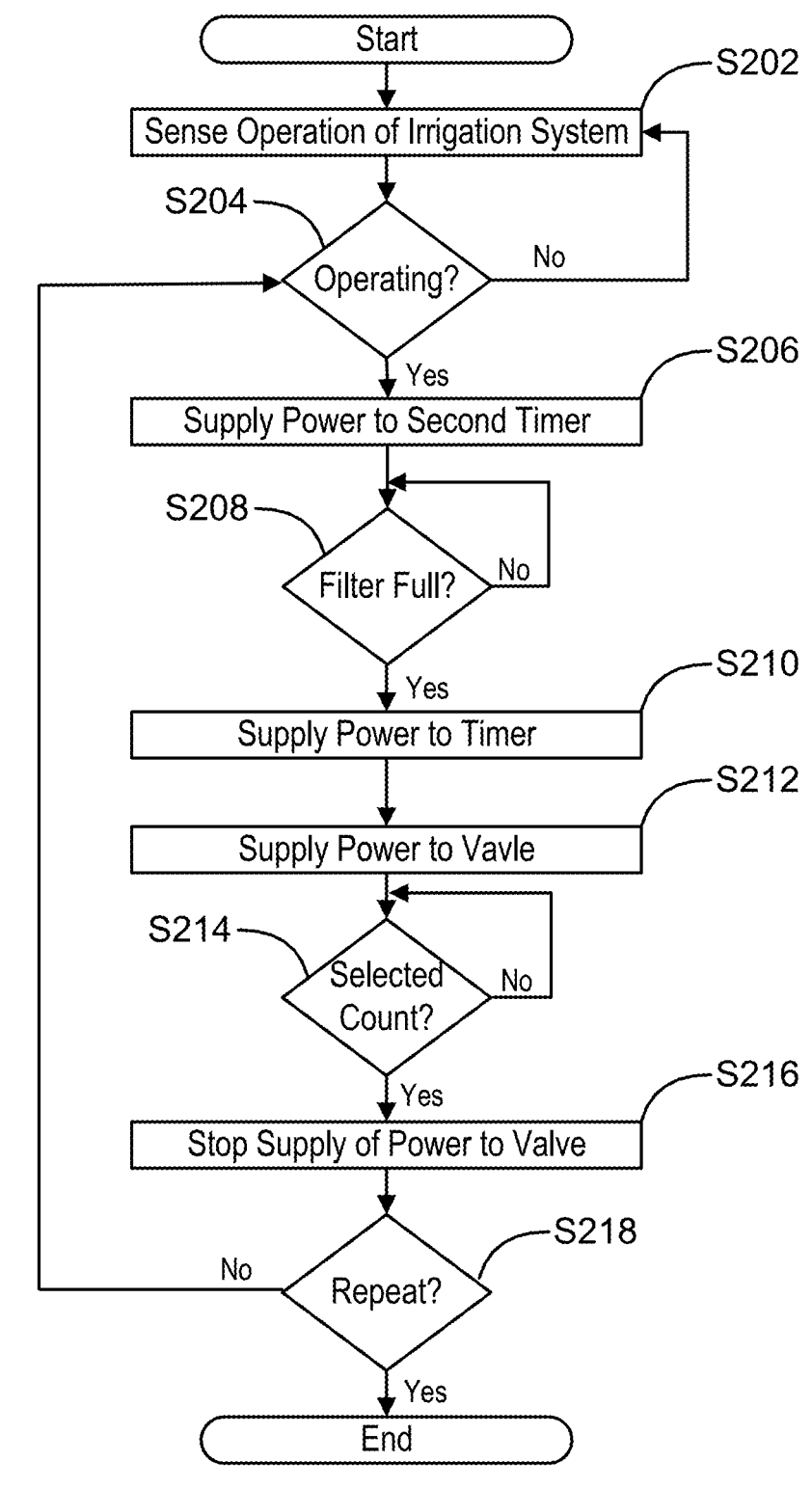
FIG. 5 is a flow diagram illustrating at least one operation of the flush system depicted in FIG. 4.

With reference to FIG. 5, in this embodiment, the first sensor 18 initially senses a pressure or flow or both (S202) that is above a set threshold indicating that the irrigation system is operating (S204). The sensor 18 has an associated switch that closes so as to provide power therethrough (S206). The second sensor 24 measures at least one of flow or pressure or level of debris in the filter (S208). When either sensed flow is below a threshold or the pressure exceeds a threshold or the level of debris is above a threshold, a switch associated with the second sensor 24 is closed to thereby provide power to the countdown timer 26 (S210). The count-down timer 26 is configured as a closed switch and allows power to be applied to the valve to open the valve (S212). The count-down timer 26 begins a count-down from a set time, say for example one (1) minute. Once the count-down timer 26 reaches a selected count-down value (e.g., zero) (S214), the count-down timer 26 opens, thereby shutting off power to the valve, thereby closing the valve (S216). In some embodiments, steps S206 thru S216 may be repeated multiple times (S218), depending on the need to flush the filter. Again, if at any time the first sensor 18 senses that the irrigation system is no longer operating, it will open its switch, thereby cutting off power to the remainder of the system and closing the valve if it is currently open.

Figure 6:
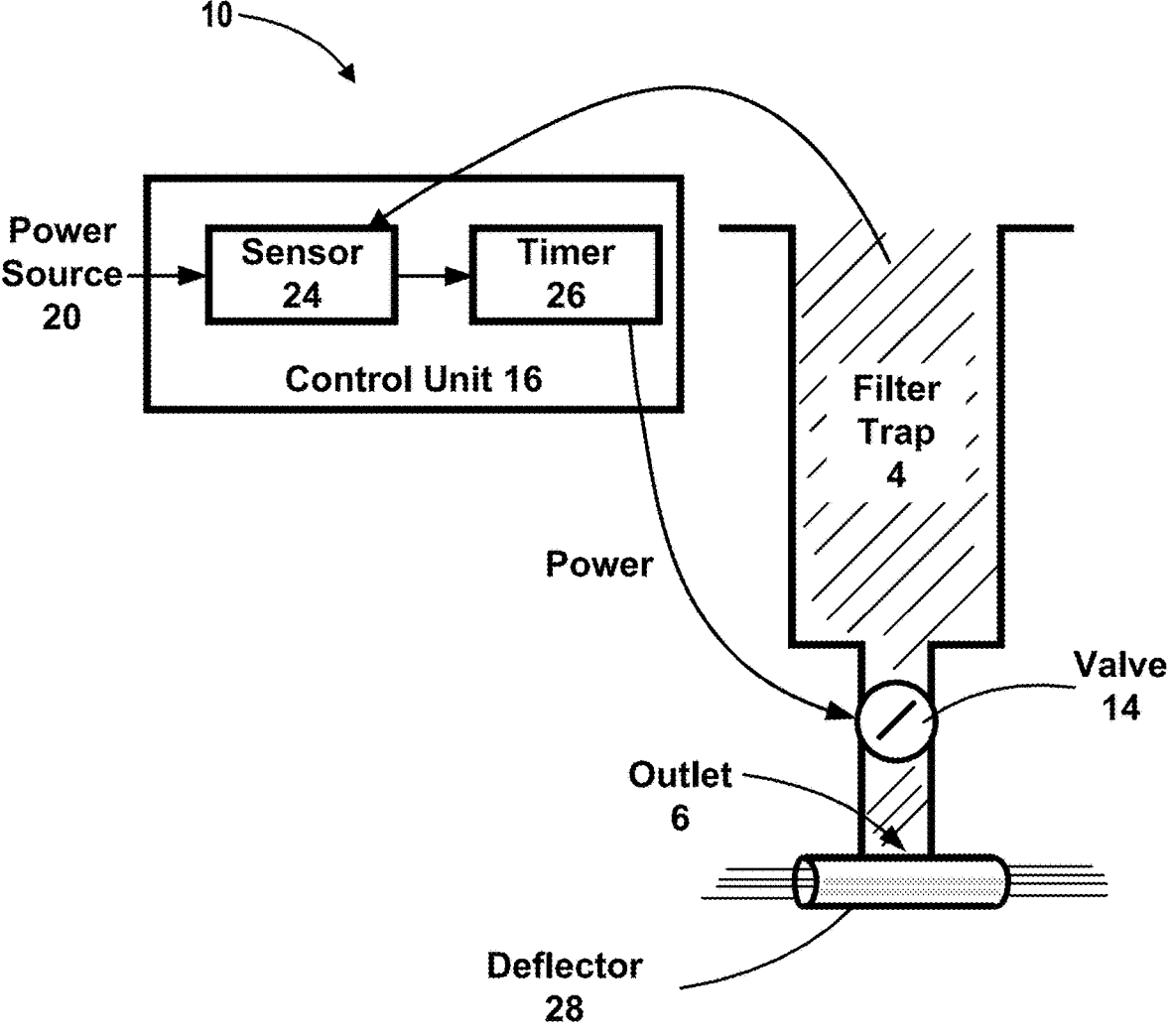
FIG. 6 is a schematic view of a flush system according to another embodiment of the invention.

FIG. 6 depicts another embodiment of the flush system according to one embodiment of the present invention. In this embodiment, the first sensor 18 is not present. The system uses only information regarding the current state of the filter to determine when to purge the filter. In this embodiment, the second sensor 24 is a pressure sensor for measuring a pressure in the filter. When the pressure in the filter is above a threshold value, it is assumed that the irrigation system is operating and that the filter needs to be flushed. In this embodiment, when the second sensor 24 senses a pressure in the filter above the threshold, it supplies power to the count-down timer 26. The count-down timer is configured to be a closed switch and supply power to the valve to open the valve to flush the filter. The count-down timer 26 then begins to count-down until from a set time, say for example, one (1) minute, it reaches a selected count-down value, after which it cuts off power to the valve causing the valve to close.

In the above embodiment, the second sensor 24 of the flush system may be a level indicator as opposed to a pressure sensor associated with the filter, as whereby the level indicator senses when the sand trap is full or close to full. In this embodiment, when level indicator indicates the sand trap is in need of emptying, the control unit for the flush system, based on the signal from the level indicator, can control the valve to open and thereby flush the sand trap. In this embodiment, a count-down timer may not be necessary, as the flush system controls opening and closing of the valve when the level indicator indicates that sand trap is full or close to full. The level indicator could be an optical or capacitive sensor located in the filter that senses the presence of debris adjacent the sensor indicating the filter is full.

Figure 7:
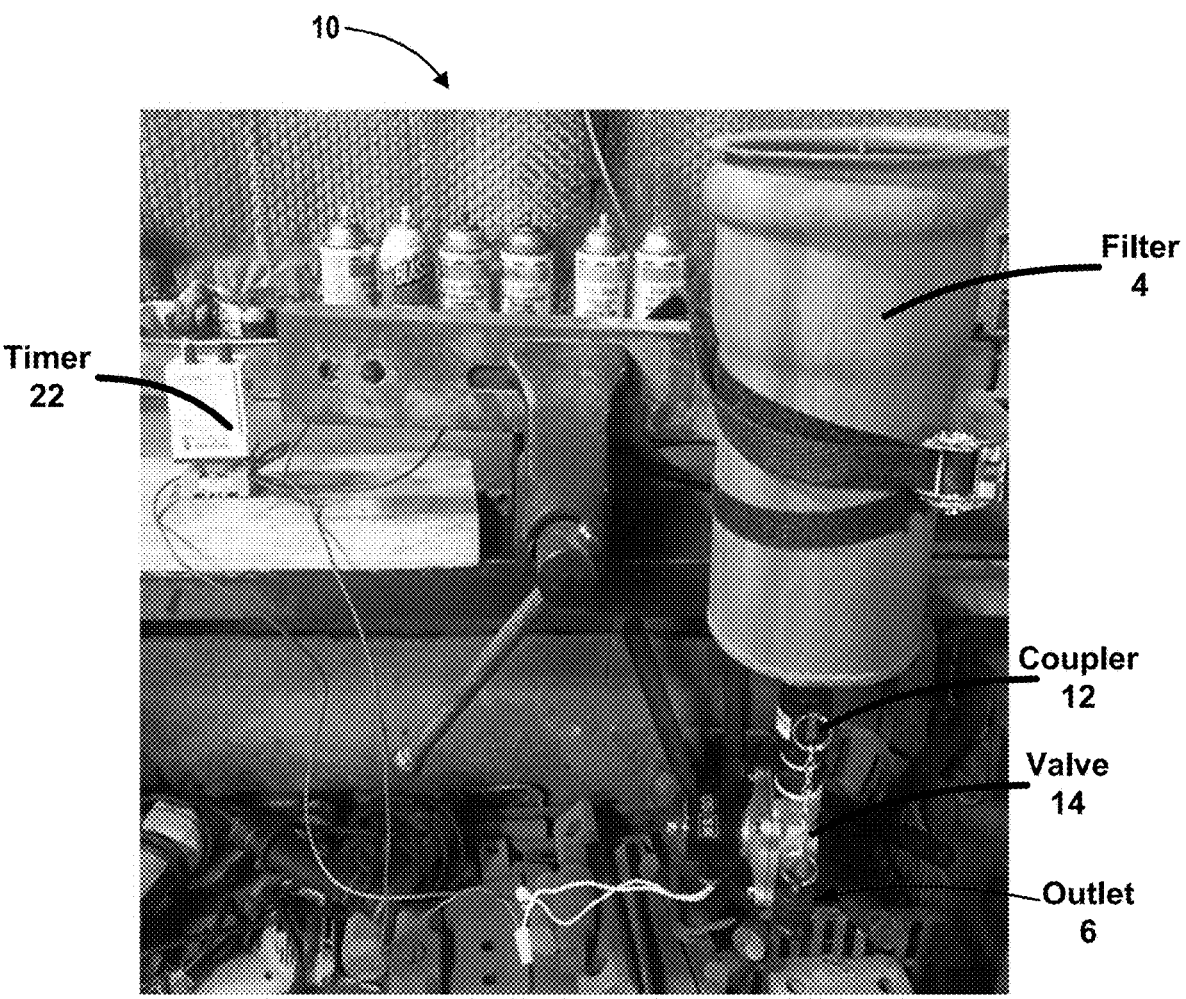
FIG. 7 is a schematic view of a flush system according to another embodiment of the invention.

FIG. 7 depicts one embodiment of the flush system connected a filter 4 associated with an irrigation system. The flush system 10 includes an electronically controlled valve 14 connected to a flush outlet 6 of the filter 4 via a coupler 12, which may be quick disconnect coupler. Connected to the valve is a timer 22 such as one of the timers described above, i.e., either a timer or a count-down timer. The first sensor 18 for detecting whether the irrigation system is operating or not is not depicted but would be connected between the timer 22 and a power source.

As described above, many of the embodiments employ an electromechanical valve. Such valves are known in the art, such as a solid solenoid valve by US Solid SKU JFZSV00003 with voltage controlled valve that is closed by default and open when energized.

As described above, many of the embodiments employ a timer for counting either up or down and in some repeating intervals. An example of such a timer is provided by Rockwell 700-HV Repeat Cycle Timing Relay 700-HV32ECU120.

As described above, many of the embodiments employ a pressure switch. An example of such a pressure switch is provided by Barksdale E1S-B15-Q66 180425 with pressure settings between 0 to 20 PSI.

The above description discloses versions of the control unit as a set of pressure switches and timer actuators. It is understood that the control unit could be one or more programmable processors that operate on computer instructions stored in a computer readable medium to perform the operations described herein, including those of FIGS. 3 & 5.

The above description is for enablement purposes and to provide illustrative examples of the invention. It is contemplated by the inventor and should be understood that various other configurations may embody the invention for flushing the filter of an irrigation system based on an interval or based on sensed need to flush the filter.

The invention claimed is:

1. A flush system for an irrigation system, the flush system comprising:
   a filter located between a source of a fluid and spray nozzles of the irrigation system, wherein the filter is used for collecting debris in the fluid supplied to the irrigation system by the source prior to the fluid being provided to the spray nozzles;
   a flush outlet in fluid communication with the filter and configured to, when said flush outlet is open, remove the debris captured by the filter during use by using the fluid in the irrigation system to purge such debris out of the filter and through the flush outlet;
   a valve in fluid communication with: (i) the source of the fluid, (ii) the filter, and (iii) the flush outlet, wherein when said valve is open, the fluid is provided to the filter and the flush outlet by the valve to flush out the debris from the filter through the flush outlet;
   a control unit in electrical communication with said valve; and
   a sensor associated with said control unit and located relative to the filter so as to sense that the irrigation system is in operation by detecting that the fluid is currently in the irrigation system and provided to the filter from the source,
   wherein said control unit is configured to control said valve to open only when said sensor indicates that the irrigation system is in operation with the fluid currently in the irrigation system and provided to the filter from the source, wherein when said valve is open the debris in the filter is purged from the filter via the flush outlet using the fluid in the irrigation system.

2. The flush system of claim 1, wherein said sensor is at least one of a flow sensor or a pressure sensor.

3. The flush system of claim 1, wherein said sensor is located in a flow path of the fluid in the irrigation system, where said flow path is in fluid communication with said filter.

4. The flush system of claim 1, wherein said sensor is associated with said filter so as to sense a state of said filter.

5. The flush system of claim 4, wherein said sensor is a flow sensor and is configured to sense a flow of the fluid in said filter, wherein said control unit is configured to control said valve to open when the flow of the fluid in said filter is below a flow threshold value.

6. The flush system of claim 4, wherein said sensor is a pressure sensor and is configured to sense a pressure in said filter.

7. The flush system of claim 6, wherein said control unit is configured to control said valve to open when the pressure in said filter exceeds a first threshold pressure value.

8. The flush system of claim 1, wherein said sensor and said control unit are together one of a flow switch or pressure switch, whereby the flow switch or the pressure switch is operated by a respective sensed flow or pressure to thereby supply power from a power source to the valve.

9. The flush system of claim 1,
   wherein said sensor is a first sensor located in a flow path of the irrigation system, where said flow path is in fluid communication with said filter, wherein said first sensor is configured to sense whether or not the irrigation system is operating,
   wherein said flush system further comprises a second sensor associated with said filter so as to sense a state of said filter, and
   wherein said control unit controls said valve to open during a time when said first sensor indicates that the irrigation system is in operation and based on input from said second sensor regarding the state of said filter.

10. The flush system of claim 1,
   wherein said sensor is a first sensor located in a flow path of the irrigation system, where said flow path is in fluid communication with said filter, wherein said first sensor is configured to sense whether or not the irrigation system is operating, wherein said flush system further comprises a second sensor associated with said filter so as to sense a pressure in said filter, and wherein said control unit controls said valve to open during a time when said first sensor indicates that the irrigation system is in operation and when said second sensor senses the pressure in said filter that exceeds a first threshold.

11. The flush system of claim 1, further comprising a timer associated with said control unit, wherein said control unit is configured to control said valve based on output from said timer.

12. The flush system of claim 11, wherein when said timer counts to a preselected time, said control unit opens said valve, if said sensor indicates that the irrigation system is in operation.

13. The flush system of claim 11, wherein said control unit opens the valve for a selected time interval as determined by said timer.

14. The flush system of claim 11, wherein said timer and said control unit are combined as a timer switch, whereby the timer switch is operated by a selected timer count of the timer to either open or close, to thereby selectively supply power from a power source to the valve.

15. The flush system of claim 1, further comprising a clock associated with said control unit, wherein said control unit is configured to control said valve based on output from said clock.

16. The flush system of claim 1, wherein said valve comprises (i) an inlet configured for communication with the flush outlet of said filter and (ii) an outlet, wherein said flush system further comprises a deflector associated with the outlet of said valve.

17. The flush system of claim 1, further comprising a coupler positioned between the flush outlet of said filter and said valve.

* * * * *